United States Patent Office 3,441,573
Patented Apr. 29, 1969

3,441,573
PRODUCTION OF 2,6-DIFORMYL-TETRAHYDRO-PYRAN AND 2-FORMYL-6-HYDROXYMETHYL-TETRAHYDROPYRAN
Rudolf Fahnenstich, Grossauheim, and Wolfgang Weigert, Offenbach am Main, Germany, assignors to Deutsche Gold- und Silber-Scheideanstalt vormals Roessler, Frankfurt am Main, Germany
No Drawing. Filed Apr. 8, 1965, Ser. No. 446,724
Claims priority, application Germany, Apr. 15, 1964, D 44,156
Int. Cl. C07d 7/14
U.S. Cl. 260—345.9
2 Claims

ABSTRACT OF THE DISCLOSURE 2,6-diformyl-tetrahydropyran and 2-formyl-6-hydroxymethyl-tetrahydropyran which are useful in the production of polymeric products, for example, the former can be condensed with pentaerythritol to produce a colorless spinnable polymer and the reduction product of either compound, namely, 2,6-bis-hydroxymethyl-tetrahydropyran, forms valuable polyesters with dicarboxylic acids and their production by reacting a compound selected from the group consisting of 2-formyl-3,4-dihydro-2H-pyran and 2-hydroxymethyl-3,4-dihydropyran at a temperature between 100–200° C. in contact with a hydroformylation catalyst and carbon monoxide and hydrogen at a pressure between about 50 and about 800 atmospheres.

The present invention relates to the production of 2,6-diformyl-tetrahydropyran and 2-formyl-6-hydroxymethyl-tetrahydropyran which are useful in the production of polymeric products, for example, the former can be condensed with pentaerythritol to produce a colorless spinnable polymer and the reduction product of either compound, namely, 2,6-bis-hydroxymethyl-tetrahydropyran, forms valuable polyesters with dicarboxylic acids.

It is known that unsaturated compounds containing an olefinic double bond can be converted with carbon monoxide and hydrogen in the presence of a catalyst to produce aldehydes and/or alcohols. Compounds of elements of Group XIII of the Periodic System, preferably cobalt compounds, are employed as the catalysts.

It is also known that either aldehydes or alcohols can be formed selectively as the main product of such oxo-synthesis or hydroformylation by the use of higher or lower temperatures, the latter favoring aldehyde production. As the carbonyl group which also is first formed in the production of alcohols can attach itself to either of the two carbon atoms concerned in the double bond, a mixture of straight and branch chained carbonyl compounds is obtained from olefins upon being subjected to the oxo-synthesis. If the starting olefins already contain functional groups, lower yields are obtained as a rule.

According to the invention 2,6-diformyl-tetrahydropyran and 2-formyl-6-hydroxymethyl-tetrahydropyran can be produced when 2-formyl-3,4-dihydro-2H-pyran or 2-hydroxymethyl-3,4-dihydropyran are subjected to an oxo-synthesis at temperatures between about 100 and 200° C., preferably, between about 125 and 150° C., in the presence of carbon monoxide and hydrogen in the presence of a hydroformylation catalyst.

Preferably, rhodium or rhodium containing hydroformylation catalysts are employed. Mixtures of rhodium compounds with cobalt compounds, for instance, can be employed as a rhodium containing catalyst. Mixed catalysts can contain rhodium in a ratio of 1000:1 to 1:1000. Carrier supported catalysts also can be used.

The advantageous action of rhodium in the catalysis already occurs when small traces of rhodium are present. Preferably, the quantity of rhodium used is between about 0.0001 and 5 mol percent and, especially, is about 0.02 mol percent. When cobalt containing mixtures are used the quantity of cobalt used can, for example, be between 0.1 and 3.0 mol percent, especially, about 1 mol percent. The mol percent are based on the total amount of starting material.

When the reaction according to the invention is carried out in the presence of rhodium it is advantageous to employ temperatures of about 130° C. In this case, 2,6-diformyl-tetrahydropyran or, respectively, 2-formyl-6-hydroxymethyl-tetrahydropyran is almost exclusively formed. The oxo-reaction in the process according to the invention proceeds in only one direction and therefore in contrast to the hydroformylation of olefins no position isomers are formed. The pressures which can be employed lie between about 50 and about 800 atmospheres and, preferably, are between about 100 and about 300 atmospheres. The ratio of hydrogen to carbon monoxide can be varied within wide limits. Preferably, it is about 1:1.4. A large excess of carbon monoxide-hydrogen mixture can be employed without disadvantage.

It furthermore was found that the yields of the process according to the invention could be increased if it is carried out in the presence of nickel boride and/or a complex former or chelating compound, such as, ethylene diamine tetraacetic acid. These substances can be used in quantities of 0.02% by weight to 10% by weight with reference to the quantity of starting material.

The process can be carried out in the presence of or the absence of a solvent. All inert organic solvents and especially aliphatic and aromatic hydrocarbons, ethers, cyclic ethers, esters and the like are suited as solvents. The process can be carried out continuously or discontinuously.

The starting 2-formyl-3,4-dihydro-2H-pyran is the dimer of acrolein, for example, produced by heating acrolein in the absence of a solvent to a temperature between 189–194° C. at a gauge pressure of 30 atmospheres. (Also see H. Schulz and H. Wagner, Angew. Chem. 62, 105, 1950.) The starting 2-hydroxymethyl-3,4-dihydro-2H-pyran is easily prepared from the 2-formyl-3,4-dihydro-2H-pyran by a Tischtschenko reaction operating in a butanolic solution using aluminum butylate as catalyst. (See H. Schulz and H. Wagner, Angew. Chem. 62, 111, 1950.)

The following examples will serve to illustrate the invention.

EXAMPLE 1

337 g. of freshly distilled 2-formyl-3,4-dihydro-2H-pyran were mixed with 650 ml. of benzene and added to a 2 liter autoclave together with 150 mg. of $Rh_2O_3$. The mixture was first heated to 150° C. and stirred for 15 minutes at this temperature under CO at a gauge pressure of 10 atmospheres to effect formation of rhodium carbonyl. After the mixture had cooled down to 130° C. further CO was injected to produce a gauge pressure of 140 atmospheres. Then hydrogen was injected until the gauge pressure was 240 atmospheres. The reaction began after about 10 minutes. After the gauge pressure had dropped to 155 atmospheres, the remaining hydrogen and carbon monoxide gas mixture was blown off and the reaction solution filtered and distilled. The benzene distilled over first followed by 170 g. of unconverted 2-formyl-3,4-dihydro-2H-pyran at 35° C. at 0.1 torr. The conversion therefore was about 50%. Finally 148 g. (69.5% of theory) of 2,6-diformyl-tetrahydropyran distilled over at 72–81° C. at 0.1 torr.

EXAMPLE 2

150 mg. of $Rh_2O_3$ and 200 ml. of benzene were placed in a 2 liter autoclave and CO injected until a gauge pressure of 10 atmospheres was reached. The mixture was heated to 150° C. for 15 minutes while stirring. After the mixture had cooled down to 130° C. a mixture of 337 g. of 2-formyl-3,4-dihydro-2H-pyran was pumped into the autoclave. Then CO was injected until the gauge pressure was 140 atmospheres and then hydrogen until the gauge pressure was 240 atmospheres. After the gauge pressure had dropped to 150 atmospheres the gas mixture was blown off and the reaction solution distilled. 124 g. of starting compound were recovered (conversion 63%). The yield of diformyl tetrahydropyran was 192 g. (70% of theory). Its boiling point was 72–81° C. at 1 torr.

EXAMPLE 3

A mixture of 337 g. of 2-formyl-3,4-dihydro-2H-pyran, 640 ml. of benzene, 150 mg. of $Rh_2O_3$ and 700 mg. of ethylene-diamine tetraacetic acid was placed in a 2-liter autoclave. The CO was injected into the autoclave until a gauge pressure of 10 atmospheres was reached and the mixture heated while stirring to 130° C. for 15 minutes. Subsequently CO was injected until the gauge pressure was 175 atmospheres and then hydrogen until the gauge pressure was 300 atmospheres. In about 3 hours the pressure dropped about 70 atmospheres. The remaining gas was blown off and the reaction solution distilled. 168 g. of the starting compound were recovered (conversion 50%). The yield of diformyl tetrahydropyran was 181 g. (85% of theory).

EXAMPLE 4

337 g. of 2-formyl-3,4-dihydro-2H-pyran, 650 ml. of benzene, 150 mg. of $Rh_2O_3$ and 2 g. of $Ni_2B$ (nickel boride) were introduced into a 2 liter autoclave and processed as in Example 1. 128 g. of unconverted starting compound were recovered (conversion 62%). The yield of diformyl tetrahydropyran was 206.5 g. (78% of theory).

EXAMPLE 5

337 g. of 2-hydroxymethyl-3,4-dihydropyran, 650 ml. of benzene, 150 mg. of $Rh_2O_3$ and 700 mg. of ethylene diamine tetraacetic acid were placed in a 2 liter autoclave. Then CO was injected into the autoclave until a gauge pressure of 8 atmospheres was reached and the mixture heated while stirring to 150° C. for 15 minutes. The mixture was then cooled to 130° C. and CO injected until the gauge pressure was 175 atmospheres and then hydrogen until the gauge pressure was 300 atmospheres. The reaction began after about 10 minutes. The reaction ended after the pressure dropped 130 atmospheres. The remaining gas was blown off and the reaction solution distilled. 12 g. of unchanged starting material were recovered (conversion 96%). The yield of 2-formyl-6-hydroxymethyl-tetrahydropyran was 226 g. (55% of theory). Its boiling point at 2 torr was 106° C. In addition, 90 g. (21% of theory) of 2,6-bis-hydroxymethyl-tetrahydropyran were recovered. Its boiling point at 3 torr. was 125° C.

We claim:
1. 2,6-diformyl-tetrahydropyran.
2. 2-formyl-6-hydroxymethyl-tetrahydropyran.

References Cited

Fieser et al.: "Advanced Organic Chemistry," Reinhold Pub. Corp., New York (1961), p. 404.

HENRY R. JILES, *Primary Examiner.*

JOHN M. FORD, *Assistant Examiner.*

U.S. Cl. X.R.

260—860, 867, 838